United States Patent
Boehringer et al.

(10) Patent No.: US 7,441,000 B2
(45) Date of Patent: Oct. 21, 2008

(54) METHOD FOR SESSION SHARING

(75) Inventors: Jochen Boehringer, Rottenberg (DE); Peter Fischer, Kronach (DE); Heiko Koziolek, Friesoythe (DE); Uwe Maurer, Grobenzell (DE); Sven Schulz, Tubingen (DE)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 10/942,684

(22) Filed: Sep. 16, 2004

(65) Prior Publication Data
US 2005/0138122 A1    Jun. 23, 2005

(30) Foreign Application Priority Data
Dec. 22, 2003   (EP)   ................................. 03104888

(51) Int. Cl.
*G06F 15/16* (2006.01)
(52) U.S. Cl. .................. 709/203; 709/217; 709/223; 709/224
(58) Field of Classification Search .......... 709/206, 709/205, 203, 217, 223, 224
See application file for complete search history.

(56) References Cited

U.S. PATENT DOCUMENTS

| | | | |
|---|---|---|---|
| 6,295,551 B1 * | 9/2001 | Roberts et al. | 709/205 |
| 6,360,250 B1 * | 3/2002 | Anupam et al. | 709/204 |
| 6,411,989 B1 * | 6/2002 | Anupam et al. | 709/204 |
| 6,871,213 B1 * | 3/2005 | Graham et al. | 709/205 |
| 7,139,795 B2 * | 11/2006 | Davis | 709/204 |
| 7,188,181 B1 * | 3/2007 | Squier et al. | 709/228 |
| 2002/0198941 A1 * | 12/2002 | Gavrilescu et al. | 709/205 |
| 2003/0110266 A1 * | 6/2003 | Rollins et al. | 709/227 |
| 2005/0204045 A1 * | 9/2005 | Belkin et al. | 709/227 |

* cited by examiner

*Primary Examiner*—Lashonda T Jacobs
(74) *Attorney, Agent, or Firm*—Dan McLoughlin; Hoffman Warnick LLC

(57) ABSTRACT

The present invention provides a method and system for session sharing that allows multiple authorized users (e.g., assistants) to access the same session and synchronize the browser views, when the current state changes. Through the use of use of session sharing, it is ensured that all users work on the same data and have the same Web side state. The Client side is kept in synchronization through the use of a publisher-subscriber model that initiates an update of all connected Clients when a state change occurs. These functionalities of the present invention ensure that all participating users can work together and can share the same state both on server and Client side.

7 Claims, 4 Drawing Sheets

METHOD FOR SESSION SHARING

BACKGROUND OF THE INVENTION

1. Field of the Invention

The subject of the present invention relates to session sharing between multiple users.

2. Related Art

Today, users often experience problems when working with complex Web Applications and Web Portals. Although most the Web Applications provide online help, the users often need human support to solve their problems. Today this can be achieved by using telephone support or external remote administration software. Both options have serious limitations. For example, the telephone support is provided by an operator who cannot see what happens on the user's screen.

The external remote administration software is not always available on the Client side and can introduce security vulnerabilities and added complexity.

Today remote assistance—or screen sharing solutions can be divided into two categories:

The first category operates on a lower level and synchronizes the screen graphically. This means that a Client Application observes screen changes and transfers the changed parts of the screen to the remote Client as a bitmap. Programs based on this concept are for example VNC, PC-Anywhere or Windows Remote Desktop.

The other category is web based and is used to synchronize browser windows between several users. The main field of application is customer relationship management and customer support on e-commerce sites. The implementation differs between the different products; most of them use JavaScript to execute commands on the Client's browser window, for example to redirect to another page or to open a chat popup. The JavaScript code reloads a special page in a certain interval. This page contains the actions that should be executed in the browser. Another solution uses a proxy server which rewrites the requested page to replace the links and add JavaScript code to the HTML page. This is needed for the synchronization and to react on change events.

Differences to the Existing Technology

Screen based applications like VNC:

These solutions need an extra application for screen sharing. Therefore the user's computer has to be prepared for using such an application and the user needs to be instructed how to use this external program.

The communication is done with a proprietary network protocol. This conflicts with most firewalls and, thus, the firewall settings need to be modified to make it work properly. Most administrators try to avoid this due to security reasons. Authentication is handled by the application itself; therefore single sign on as in the portal environment is not possible. Since these programs are graphic/screen based, they permit full access to the whole screen of the user. This can be used for remote administration inside one company but is not acceptable for supporting a customer.

Web Based Customer Relationship Management Solutions:

These products focus on communication and provide chat and help functionality. Additionally most of them support page redirects by executing a script command on the Client's browser. The operator can use this feature to send the customer to a certain page in the web site. In general the operator has no access to the user's session; he just can influence it through issuing JavaScript commands. This is only done in one direction (operator to customer) so the operator's browser is not synchronized to the customer's browser.

In view of the foregoing, a need exists for a system that improves the remote assistance or remote collaboration within applications, especially Web Applications.

SUMMARY OF THE INVENTION

The present invention provides a method and system for session sharing that allows multiple authorized users (e.g. a remote assistant) to access the same session and synchronize the browser views, when the current state changes. Through the use of session sharing it is ensured that all users work on the same data and have the same Web Application side state. The Client side is kept in synchronization through the use of a publisher-subscriber model that initiates an update of all connected Clients when a state change occurs. These functionalities of the present invention ensure that all participating users can work together and can share the same state both on server and Client side.

In a preferred embodiment of the present invention a blink functionality is added to each link provided by a Portal page, e.g. via Java Script, triggered by the Update Agent running in the user's and assistant browser. This blinking functionality indicates which link has been clicked by opposite side. The update agent is activating the blink functionality of a specific link identified by a URL.

The present invention may be preferably used in the Remote Web Assistance field. It gives the authorized assistant the possibility to join the current user session. The main benefit is that the assistant can assist the user without any additional software installations on both sides. This includes that the user can stay in his Web Application and does not need to handle any additional software to access help. Remote Web Assistance will seamlessly integrate into existing Web Application because it is based on proven web technologies.

By using the present invention the user and the assistant save time, and can quickly return to their original work, thus saving costs and increasing productivity. The present invention may be also used in the field of education. The instructor is enabled to switch to the learner's session and support him. Additionally it's possible, that the instructor demonstrates something and all learners' clients are synchronized. On an e-commerce or online banking portal it would be possible to support the customer in using the customer in using the company's services and to make it easier for the customer to do certain tasks.

A first aspect of the present invention provides a method for sharing session data, comprising: sending a request from a first user to a web application; sending session data and an information element from the web application to the first user; actuating the information element to send a session sharing request to the web application, wherein the session sharing request includes at least a session ID of the first user; sending at least the session ID of the first user and a universal resource locator (URL) of the web application to a second user who is allowed to share the session data; sending a session sharing request from the second user to the web application, wherein the session sharing request from the second user includes at least the session ID of the first user; assigning the session data to the second user, and sending the session data to the second user.

A second aspect of the present invention provides a system for sharing session data, comprising: a system for sending a request from a first user to a web application; a system for sending session data and an information element from the web application to the first user; a system for actuating the information element to send a session sharing request to the web application, wherein the session sharing request includes at least a session ID of the first user; a system for sending at least the session ID of the first user and a universal resource locator (URL) of the web application to a second user who is allowed to share the session data; a system for sending a session sharing request from the second user to the web application, wherein the session sharing request from the second user includes at least the session ID of the first user; a system for assigning the session data to the second user, and a system for sending the session data to the second user.

A third aspect of the present invention provides a program product stored on a recordable medium for sharing session data, which when executed comprises: program code for sending a request from a first user to a web application; program code for sending session data and an information element from the web application to the first user; program code for sending a session sharing request to the web application in response to an actuation of the information element, wherein the session sharing request includes at least a session ID of the first user; program code for sending at least the session ID of the first user and a universal resource locator (URL) of the web application to a second user who is allowed to share the session data; program code for sending a session sharing request from the second user to the web application, wherein the session sharing request from the second user includes at least the session ID of the first user; program code for assigning the session data to the second user, and program code for sending the session data to the second user.

A fourth aspect of the present invention provides a method for deploying an application for sharing session data, comprising:

providing a computer infrastructure being operable to: send a request from a first user to a web application; send session data and an information element from the web application to the first user; actuate the information element to send a session sharing request to the web application, wherein the session sharing request includes at least a session ID of the first user; send at least the session ID of the first user and a universal resource locator (URL) of the web application to a second user who is allowed to share the session data; send a session sharing request from the second user to the web application, wherein the session sharing request from the second user includes at least the session ID of the first user; assign the session data to the second user, and send the session data to the second user.

A fifth aspect of the present invention provides computer software embodied in a propagated signal for sharing session data, the computer software comprising instructions to cause a computer system to perform the following functions: send a request from a first user to a web application; send session data and an information element from the web application to the first user; actuate the information element to send a session sharing request to the web application, wherein the session sharing request includes at least a session ID of the first user; send at least the session ID of the first user and a universal resource locator (URL) of the web application to a second user who is allowed to share the session data; send a session sharing request from the second user to the web application, wherein the session sharing request from the second user includes at least the session ID of the first user; assign the session data to the second user, and send the session data to the second user.

BRIEF DESCRIPTION OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

DETAILED DESCRIPTION OF THE DRAWINGS

Figure 1A:
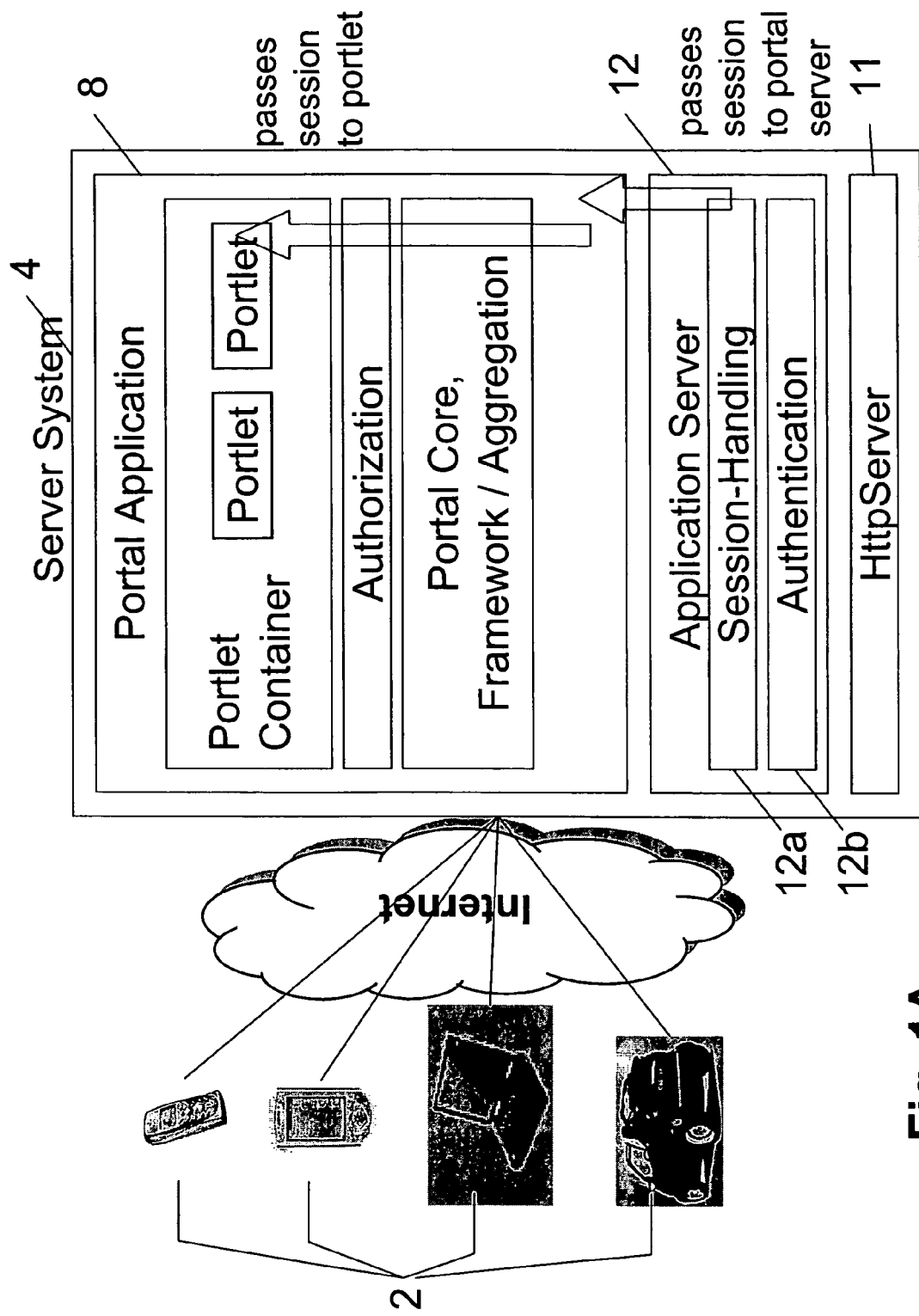
FIG. 1A shows an existing prior art Portal Application environment without the present invention.

With respect to FIG. 1A, there is depicted a prior art Portal Application (Portal Server 8) running in a Server System 4 without the present invention. The Session Handling Component 12a and the Authentication Component 12b are part of the Application Server 12. The Application Server 12 combines or works with a HTTP-Server 11. The HTTP-Server 11 provides several different ways to forward a request created by a device 2 to the Application Server 12 and to return a modified or new Portal page created by the portal application 8. During the login of a user with a certain device 2, the application server 12 especially its Session Handling Component 12a creates a device-session and passes it to the Portal Application 8. The Portal Application 8 itself passes the device-session to the portlet to be accessed by the user.

Figure 1B:
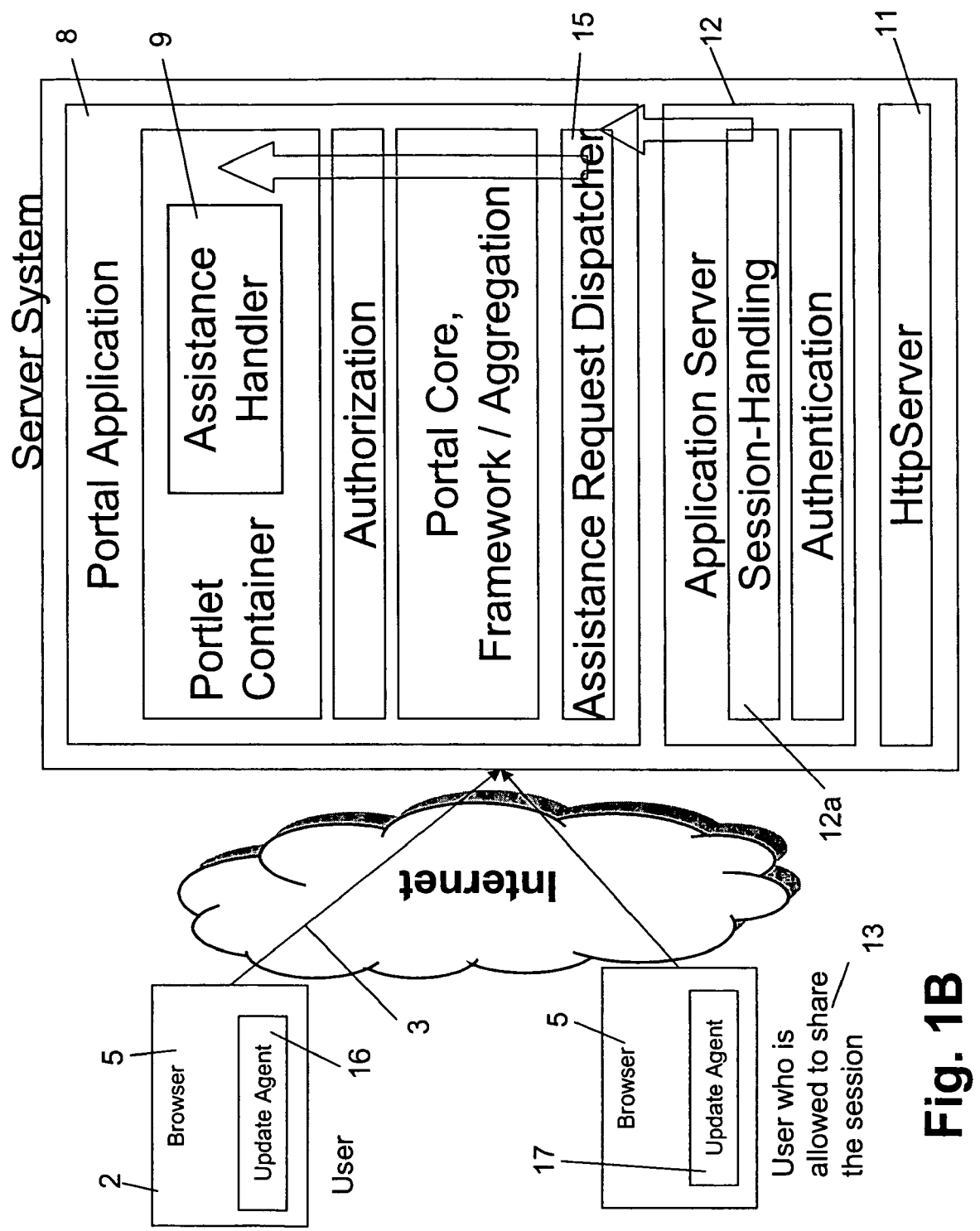
FIG. 1B shows the same existing Portal Application extended by the inventive Assistant Handler and the Assistant Request Dispatcher.

With respect to FIG. 1B, there is depicted a Portal Application 8 using the present invention. The session-handling of the application server 12 remains unchanged as described in FIG. 1A.

A new Assistance Request Dispatcher 15 and Assistance Handler 9 are added to the portal application 8 of FIG. 1A. On the user and assistant Client side (user who is allowed to share user session data) an Update Agent 16, 17 is additionally added typically implemented as an Applet.

For example a mobile device 2 such as a mobile phone, personal digital assistant, or notebook have a communication connection 3 with a Web Application 8 running on a Server System 4. The communication between the mobile device 2 (user or user who is allowed to share user's session data) and the Web Application 8 preferably uses the HTTP protocol. The Web Application 8 may be for example a Portal Application. However the present invention may be used by any other Web Application requiring session handling. The Web-Application 8 or an Application Server creates for each mobile device 2 that makes a login to the Web Application 8 a device-session. The device-session can be created by any prior art session handling procedure like URL rewriting or use of cookies.

Furthermore, a new Assistant Handler 9 is preferably part of the Portal Application 8. The Assistant Handler 9 ensures that the assistants or the collaborating users (e.g., user who is allowed the share user session data) use the identical session data as the requesting user.

The main functionality of the Assistance Handler 9 is to generate a general user-interface (GUI) on each portal page provided to the user, and enabling the user to generate an assistant request or a collaboration request to be sent to the Assistance Handler 9.

The Assistance Handler 9 receives those requests generated by the GUI that includes the session ID of the respective user, e.g., session cookie, and stores the session ID with the URL of the user's request. Any user or assistant who is interested in and allowed to join an existing session for assistance or collaboration can query the Assistant Handler 9 for the current available sessions. In such a case the Assistant Handler 9 for example provides a list of sessions including links to join such sessions. The corresponding URLs of such links contain the session ID as a parameter. Clicking on the link generates a request to the Assistant Handler 9. The Assistant Handler 9 ensures that the assistant or the collaborating user uses the identical session data as the requesting user. In order to achieve that either the session data of the user session and the data of the assistant session are being synchronized or making the assistant or collaborating requester use the same session object, e.g., by using the same cookie or session ID for all subsequent requests.

The user's browser 5 generates a new request for that URL. The Portal Application 8 sends the identical Portal page to the Assistant or collaborating user because both user and assistant are using the same request and the same session data. User or assistant can initiate new requests from within the current Portal page resulting in a returned new Portal page.

In a preferred embodiment of the present invention, each new assistant or collaborating user has to be authenticated before he is allowed to share the already existing user session. This may be implemented as a part of the Portal Application or of the Application Server.

Furthermore, a new Assistant Request Dispatcher 15 is part of the Portal Application 8.

It is object of the dispatching mechanism to ensure that all users and assistants always receive the results of the latest request generated by any user or assistant which is participating on that session. That is necessary because the content of a portal page dependents not only on session data which is shared between the users by above mentioned Assistant Handler but also on data contained in a single request which is not automatically shared.

The main functionality of the Assistance Request Dispatcher 15 is to receive those new requests to the Portal Application 8 being sent by users or assistants, and dispatches these requests to all users and assistants who are participating on the session of the originator of that request. These requests are received on the user's or assistant's side by an Update Agent component 16. That component 16 triggers a redirect of the browser resulting in a new request of the browser 5 to the Portal Application that is identical to the original request. On the Portal Application side 8 that request is executed and the result is sent back to the originating browser.

A preferred embodiment of the present invention is to provide a blink functionality which is added to each link provided by a Portal page, e.g., via Java Script, triggered by the Update Agent 16, 17 running in the user's or assistant browser 5. This blinking functionality indicates which link has been clicked by opposite side. The Update Agent 16 is activating the blink functionality of specific links identified by URL.

In alternative embodiment of the present invention, the Portal Application additionally includes a session sharing component (not shown) that allows continuing an already existing user-session with a Portal Application 8 by an assistant or a collaborating user. All single sessions created and maintained by a Session Handling Component 12a are now controlled by an overall session created by the session sharing component. The overall-session represents a session for multiple user (e.g. the user who is asking for assistance, the assistant who is asked for help) to which references to all single existing sessions created by the multiple users with the Portal Application as well as the latest session data (latest overall session data) created by the user, assistant, or collaborating device currently in use are assigned. The single session data created by the multiple user is intercepted by the session sharing component and assigned to the overall session as the latest overall session data. All single existing sessions of the multiple user not currently in use are synchronized with the latest overall session data.

This alternative embodiment has to be used if the Portal Application does not allow use of the same session ID by different users.

In a further embodiment of the present invention the communication between user and assistant or collaborating is secured by existing encryption mechanisms, e.g., SSL, Public-key Method.

Figure 2:
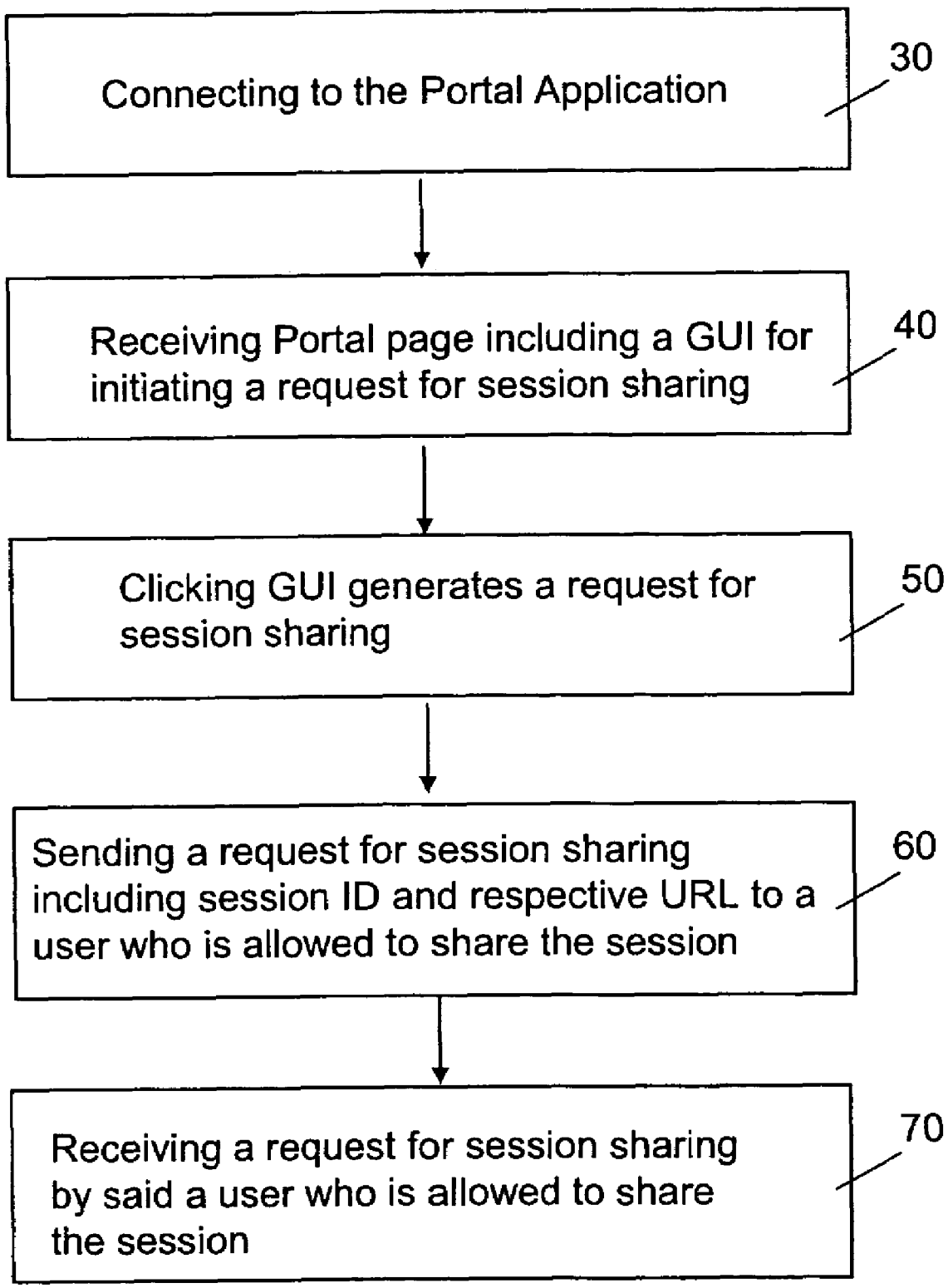
FIG. 2 shows a flow diagram with the inventive method steps performed by said inventive Assistant Handler.

With respect to FIG. 2, there is depicted a flow diagram with the inventive method steps performed by said inventive Assistant Handler.

In a first step the user connects to the Portal Application via the Application Server by using his browser 30.

The Application Server creates a new session for the respective user. This session ID is being transferred between user and Portal Application for all subsequent requests. The most known mechanisms for session handling are "rewriting URLs" and "creating cookies." URL rewriting is based on the idea of embedding a unique ID (generated by the Application Server) in each URL of the response from the server. When the Client sends a request to one of such URL, the browser sends this ID back to the server.

Cookies are an alternative to URL rewriting. A cookie is not sent as a query string but is exchanged within the bodies the HTTP requests and response. There is no need to rewrite URLs. In order to send a cookie to a Client, a server creates a cookie header and attaches it to the HTTP response. The Client receives the request and extracts the cookie response header. The cookie is usually stored on a file on the Client's system.

In a next step, the Client user receives a Portal page including a GUI for assistance or collaboration 40.

By clicking that GUI an assistance or collaboration request is created and being sent to the Assistant Handler. The assistance or collaboration request includes information about the user (e.g., user identifier) and the session ID assigned to the user by the Application server 50.

There are two alternative steps to deal with the incoming assistance or collaboration requests.

In the first alternative, the Assistant Handler provides session information about the user to the assistant or the collaborating user. Preferably, the Assistant Handler provides to the assistant or collaborating user a link with the corresponding URL and the session ID 60. By clicking that link the user's or collaborating user's browser generates a request to the Assistant Handler 70.

In another alternative, any collaborating user or assistant who is interested in and allowed to join an existing session for assistance or collaboration can query the Assistant Handler for the current sessions. In such a case the Assistant Handler provides for example a list of sessions including links to join such sessions. The corresponding URL of such links contains the session ID as a parameter. Clicking on the link generates a request to the Assistant Handler 70.

In both alternatives, the Assistant Handler ensures that the assistant or the collaborating user uses the identical session data as the requesting user. In order to achieve that either the session data of the user session and the data of the assistant or collaborating user session are being synchronized or making the assistant or collaborating user use the same session object, e.g. by using the same cookie or session ID for all subsequent requests.

Figure 3:
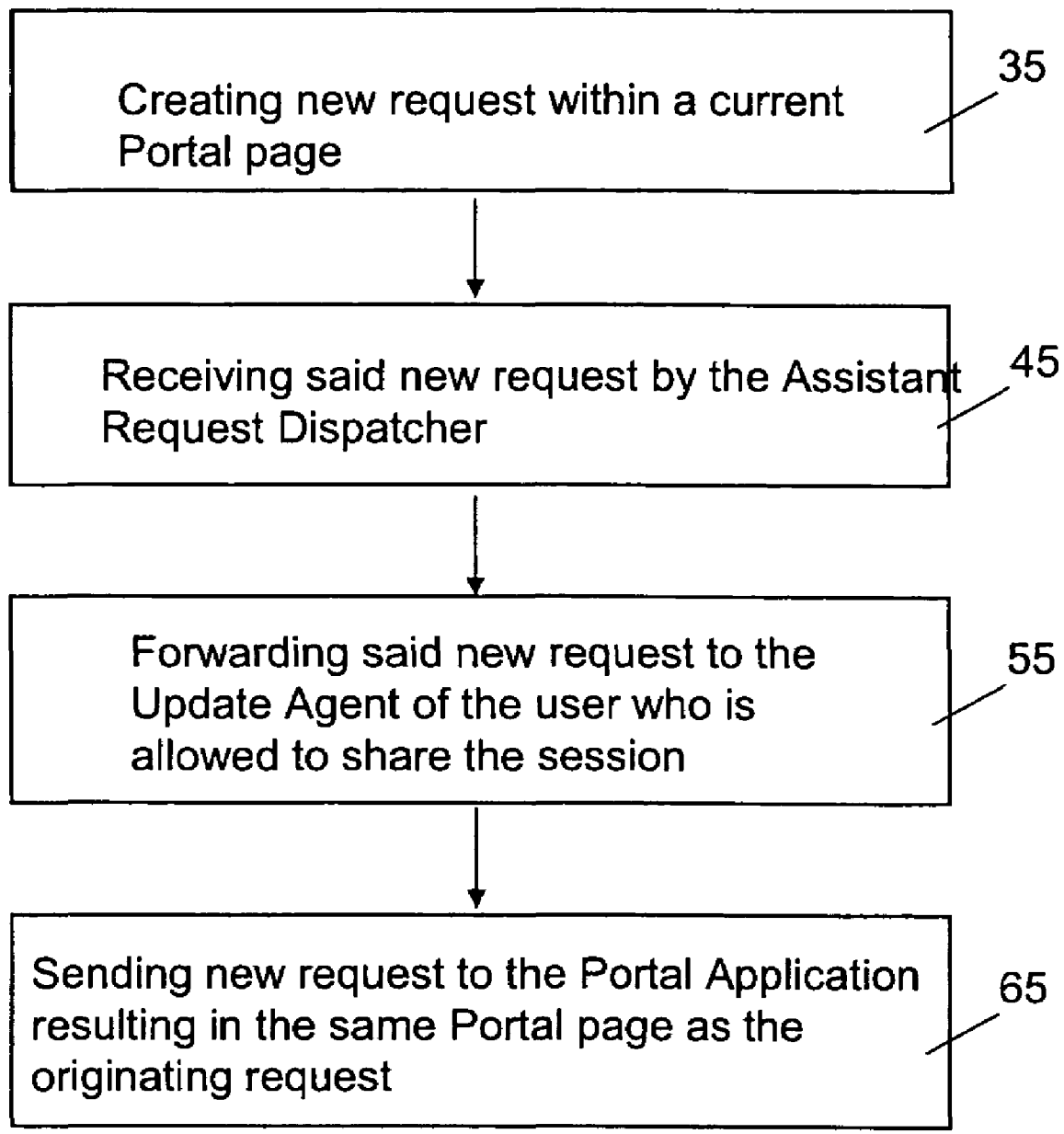
FIG. 3 shows a flow diagram with the inventive method steps performed by said inventive Assistant Request Dispatcher.

With respect to FIG. 3, there is depicted a floating diagram with the inventive method steps performed by said inventive Assistant Request Dispatcher.

In a first step, the user creates a new request from within the current Portal page 35. That request is sent to the Assistance Request Dispatcher 45.

In a next step, the Assistance Request Dispatcher dispatches that request to the Update Agent of the assistant's or user's browser 55.

The browser then redirects that request to the Portal Application as well resulting in the same new Portal page as the originating new request 65.

The same happens when the assistant or the collaborating user clicks a link. Then the user gets automatically an update.

In further preferred embodiment of the present invention, a link functionality is used by the inventive method. That means each clicking on a link activates a blink mechanism on that link which preferably blinks several times in a different color before the update request is triggered. The blinking link is activated by the Update Agent.

That mechanism secures that the user can easily show the assistant what he has tried to do or he does right now, and on the other hand the assistant can show the user where he should click or should have clicked.

The invention claimed is:

1. A method for sharing session data, comprising:
    sending communication connection request from a first user to a web application;
    sending session data and an information element from the web application to the first user, in response to the communication connection request, to create the communication connection, wherein the information element comprises a graphical user interface which includes a link for automatically generating a first session sharing request from the first user and the first session sharing request includes at least a session ID of the first user;
    sending at least the session ID of the first user and a universal resource locator (URL) of the web application from the web application to a second user who is allowed to share the session data in response to the first session sharing request;
    sending a second session sharing request from the second user to the web application in response to the sending of at least the session ID of the first user and the URL of the web application, wherein the second session sharing request from the second user includes at least the session ID of the first user;
    assigning and sending the session data from the web the application to the second user.

2. The method of claim 1, further comprising:
    automatically dispatching each additional session sharing request to the second user;
    automatically receiving a session sharing request from the second user, wherein the session sharing request contains information included in the additional session sharing request; and
    sending data generated by the additional session sharing request to the first and second users.

3. The method of claim 2, wherein each additional session sharing request is generated by clicking a link in the session data, and wherein clicking of the link automatically causes the link to blink in the session data provided to the first and second users.

4. The method of claim 1, wherein the second user is authenticated by a login procedure.

5. The method of claim 1, wherein communication between the first user, the second user, and the web application is encrypted.

6. The method of claim 1, wherein the web application comprises a portal application.

7. The method of claim 1, wherein the first and second users share the session data using a client-server architecture.

* * * * *